Patented Nov. 15, 1938

2,136,502

UNITED STATES PATENT OFFICE 2,136,502

PYRIDINE - ORTHO - DICARBOXYLIC ACID DIAMIDES

Max Hartmann, Riehen, and Hellmut Ensslin, Basel, Switzerland, assignors to the firm Society of Chemical Industry in Basle, Basel, Switzerland No Drawing. Application November 27, 1935, Serial No. 51,970. In Switzerland December 5, 1934

9 Claims. (Cl. 260—295)

It is known that N-disubstituted amides of pyridine-mono-carboxylic acids, particularly of pyridine-3-carboxylic acid, have a favorable effect upon the circulation and respiration. On the other hand, the pyridine-2:5-dicarboxylic acid-bis-diethylamide appears to be pharmacologically inactive (Chemisches Zentralblatt 1934, II, page 3255).

This invention is based on the observation that by converting pyridine-ortho-dicarboxylic acids into their aliphatic substituted diamides there are obtained compounds of particularly favorable effect upon the circulation of the blood and the respiration when administered, for example, by intravenous injection in the usual manner.

The invention consists in the manufacture of new substituted pyridine-ortho-dicarboxylic acid diamides by reaction of a pyridine-ortho-dicarboxylic acid or a derivative thereof, such as for instance a salt, an ester, a halide or an anhydride, on a primary or secondary aliphatic amine or a salt thereof, or on an aliphatic derivative of carbamic acid, for instance a halide, in presence or absence of a solvent, of a condensing agent and of an agent that binds acid.

The process may be performed in stages by first producing an N-substituted monoamide of the pyridine-ortho-dicarboxylic acid and then converting this in the manner indicated above into the N,N'-substituted diamide. In this manner there may be obtained, among others, diamides the amide groups of which are differently substituted.

In the reaction of the free pyridine-ortho-dicarboxylic acid or the corresponding monoamido-carboxylic acid with an amine there may be used with advantage a condensing agent, such as a phosphorous halide, thionyl chloride, phosgene or phosphorus pentoxide. The carboxylic acid and the amine may also be used in the form of their salts.

The new compounds are therapeutically useful.

The following examples illustrate the invention, the parts being by weight:

Example 1

19 parts of pyridine-2:3-dicarboxylic acid-dichloride are caused to react, while cooling, with 31 parts of diethylamine in benzene solution. Strong caustic soda solution is added and the benzene solution is separated, dried and the benzene and the free diethylamine are distilled. The pyridine-2:3-dicarboxylic acid-bis-diethylamide crystallizes from petroleum ether. It melts at 56–57° C. and boils at 191–194° C. under 7 mm. pressure. The colorless crystals are freely soluble in water and in most organic solvents, with the exception of petroleum ether.

The same compound can for example also be obtained by the action of pyridine-2:3-dicarboxylic acid-dichloride on an aqueous diethylamine solution.

In analogous manner the following compounds may for example also be made:—the pyridine-2:3-dicarboxylic acid-bis-diallyl-amide, the pyridine-2:3-dicarboxylic acid-bis-(di-n-propylamide) of boiling point 171–182° C. under 0.4 mm. pressure, and the pyridine-2:3-dicarboxylic acid-bis-(di-isopropylamide) of melting point 145–146° C. and of boiling point 159–161° C. under 0.45 mm. pressure.

Example 2

6 parts of pyridine-2:3-dicarboxylic acid-dichloride are heated together with 7 parts of diethylamine-hydrochloride for 2 hours at 120° C. Hydrogen chloride is evolved. From the mass the pyridine-2:3-dicarboxylic acid-bis-diethylamide is obtained in the manner described in Example 1.

The same compound may also be obtained by the reaction of the sodium or calcium salt of pyridine-ortho-dicarboxylic acid with diethylcarbamic acid-chloride.

Example 3

167 parts of pyridine-2:3-dicarboxylic acid are introduced into 150 parts of diethylamine and the salt produced is mixed, while stirring, with 210 parts of phosphorus oxychloride, the mixture being then heated to about 150° C. When the reaction is complete, the mass is dissolved in water and the pyridine-2:3-dicarboxylic acid-bis-diethylamide is separated by means of alkali.

Instead of phosphorus oxychloride, phosphorus pentoxide, thionyl chloride or phosgene may be used.

Example 4

30 parts of pyridine-2:3-dicarboxylic acid-anhydride are mixed with 30 parts of diethylamine. The diethylamine salt of pyridine-2-carboxylic acid-3-carboxylic acid-diethylamide thus obtained is heated with 21 parts of phosphorus oxychloride for some time at 120° C. The pyridine-2:3-dicarboxylic acid-bis-diethylamide is isolated in the manner described in the preceding examples.

Example 5

To an ethereal solution of 28.5 parts of di-n-butylamine there are dropped in, in presence of 30 parts of caustic soda solution of 30 per cent. strength and at 20° C., while stirring well, an ethereal solution of 20.4 parts of pyridine-2:3-dicarboxylic acid-dichloride. The ethereal solution is washed with caustic soda solution, dried and then evaporated to obtain pyridine-2:3-dicarboxylic acid-bis-(di-n-butylamide) of melting point 49–51° C. and of boiling point 203–203.5° C. under 2 mm. pressure.

Example 6

For the dibutylamine used in Example 5 there are substituted 19 parts of piperidine, whereupon there is produced in a similar manner the pyridine-2:3-dicarboxylic acid-di-piperidide which melts at 94–96° C. and boils between 221 and 225° C. under 2 mm. pressure. It is freely soluble in water and in most organic solvents.

Example 7

19.5 parts of pyridine-2:3-dicarboxylic acid-dimethyl-ester are heated with 8 parts of methyl alcohol and 21 parts of ethylamine in a tube for 4 hours at 60° C. After separation of the methyl alcohol and the excess of ethylamine there is obtained the pyridine-2:3-dicarboxylic acid-bis-ethylamide of melting point 99–101° C. It is freely soluble in water and most organic solvents.

The compound may also be obtained, for example, from pyridine-2:3-dicarboxylic acid-dichloride and ethylamine.

Example 8

An ethereal solution of 41 parts of pyridine-2:3-dicarboxylic acid-dichloride is added, in drops, to an ethereal solution of 20 parts of dimethylamine, while cooling. When the reaction is complete, caustic soda solution is added, the ethereal solution is separated and the solvent distilled. The residue is dissolved in ethyl acetate, petroleum ether is added, whereupon the pyridine-2:3-dicarboxylic acid-bis-dimethylamide crystallizes in the form of colorless tablets of melting point 96–98° C. It is freely soluble in water.

The same compound may be obtained, for example, by the action of pyridine-2:3-dicarboxylic acid-dichloride on an aqueous solution of dimethylamine.

Example 9

33 parts of pyridine-2-carboxylic acid-3-carboxylic acid-diethylamide (made, for example, from its diethylamine salt described in Example 4 and hydrochloric acid) are suspended in 100 parts of toluene and the suspension is mixed with 15 parts of di-n-propylamine. While stirring the mixture there are added by drops 15 parts of phosphorus oxychloride; the whole is heated for some time at 120° C. and then worked up as described in the preceding examples. The pyridine-2-carboxylic acid-di-n-propylamide-3-carboxylic acid-diethylamide is an oil of boiling point 170–172° C. under 0.4 mm. pressure.

In analogous manner the following compounds may be made:—the pyridine-2-carboxylic acid-diethylamide-3-carboxylic acid-di-n-propylamide of boiling point 161–162° C. under 0.15 mm. pressure as well as the corresponding iso-compounds; further the pyridine-2-carboxylic acid-diallylamide-3-carboxylic acid-diethylamide. In a similar manner the differently substituted pyridine-3:4-dicarboxylic acid diamides may be obtained.

Example 10

50 parts of pyridine-3:4-dicarboxylic acid are mixed with 132 parts of phosphorus pentachloride and the mixture is heated for 1 hour at 100° C. On cooling, pyridine-3:4-dicarboxylic acid-dichloride crystallizes. It is filtered and washed with acetone. 30 parts of this dichloride are mixed in ethereal solution with 55 parts of diethylamine and, when the reaction is complete, the mass is worked up as described in Example 1. The pyridine-3:4-dicarboxylic acid-bis-diethylamide thus obtained may be recrystallized from petroleum ether. It melts at 61–63° C. and boils at 143–146° C. under 0.3 mm. pressure. In water and in most organic solvents it is freely soluble.

Example 11

In Example 10 the diethylamine is exchanged for the equivalent quantity of di-n-propylamine; there is thereby obtained pyridine-3:4-dicarboxylic acid-bis-(di-n-propylamide) in the form of an oil which boils at 180° C. under 0.3 mm. pressure.

In analogous manner the pyridine-3:4-dicarboxylic acid-bis-(di-iso-propylamide) of melting point 157–159° C. and of boiling point 164–174° C. under 0.9 mm. pressure may be made.

What we claim is:

1. The therapeutic compounds which are pyridine-ortho-dicarboxylic acid amides of the formula

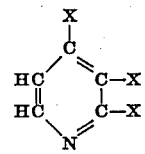

wherein two $x$'s in ortho position stand for the group

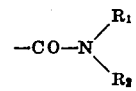

in which $R_1$ represents an alkyl radical containing a maximum of four carbon atoms and $R_2$ represents a member of the group consisting of hydrogen and an alkyl radical containing a maximum of four carbon atoms and in which $R_1$ and $R_2$ may also be linked to form an alkylene chain, and wherein the third $x$ represents hydrogen.

2. The therapeutic compounds which are pyridine-ortho-dicarboxylic acid amides of the formula

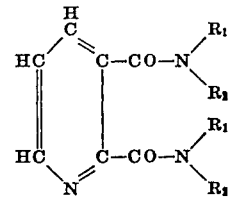

wherein $R_1$ represents an alkyl radical containing a maximum of four carbon atoms and $R_2$ represents a member of the group consisting of hydrogen and an alkyl radical containing a maximum of four carbon atoms and in which $R_1$ and $R_2$ may also be linked to form an alkylene chain.

3. The therapeutic compounds which are pyridine-ortho-dicarboxylic acid amides of the formula

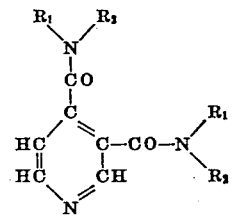

wherein $R_1$ represents an alkyl radical containing a maximum of four carbon atoms and $R_2$ represents a member of the group consisting of hydrogen and an alkyl radical containing a maximum of four carbon atoms and in which $R_1$ and $R_2$ may also be linked to form an alkylene chain.

4. The therapeutic compounds of the formula

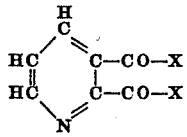

wherein both $x$'s stand for the same aliphatically substituted amide groups, the substituents of the said groups consisting of alkyl radicals containing a maximum of four carbon atoms.

5. The therapeutic compounds of the formula

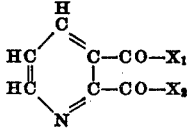

wherein $x_1$ and $x_2$ stand for different aliphatically substituted amide groups, the substituents of the said groups consisting of alkyl radicals containing a maximum of four carbon atoms.

6. The therapeutic compounds of the formula

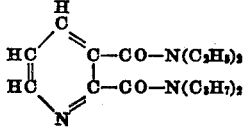

7. The therapeutic compound of the formula

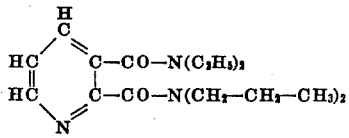

8. The therapeutic compound of the formula

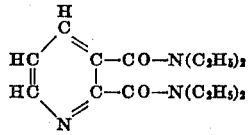

9. The therapeutic compound of the formula

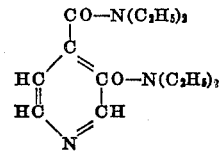

MAX HARTMANN.
HELMUTT ENSSLIN.